3,576,822
THIOPHENE THIOSEMICARBAZONES
Ronnie G. Edie and William A. White, Indianapolis, Ind., assignors to Eli Lilly and Company, Indianapolis, Ind.
No Drawing. Filed Dec. 18, 1967, Ser. No. 691,162
Int. Cl. A61k 27/00; C07d 63/12
U.S. Cl. 260—329                 4 Claims

ABSTRACT OF THE DISCLOSURE

The present invention relates to novel thiophene thiosemicarbazones and derivatives thereof.

---

The compounds of the present invention have the following formula:

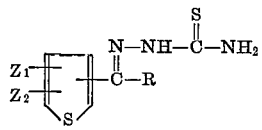

wherein R is alkyl of $C_2$–$C_5$ carbon atoms, inclusive; haloalkyl of $C_1$–$C_5$ carbon atoms, inclusive; cycloalkyl of $C_3$–$C_6$ carbon atoms, inclusive; phenyl, 1-adamantyl and COOH, and wherein $Z_1$ and $Z_2$ are the same or different members of the group consisting of hydrogen alkyl of $C_1$–$C_5$ carbon atoms, inclusive; halo, amino and nitro, except that R may not be an alkyl of two carbon atoms when $Z_1$ and $Z_2$ are hydrogen.

Illustrative compounds of the present invention include:

cyclopropyl 2-thienyl ketone thiosemicarbazone
5-iodo-2-thienyl ethyl ketone thiosemicarbazone
5-iodo-3-thienyl ethyl ketone thiosemicarbazone
5-chloro-3-thienyl ethyl ketone thiosemicarbazone
cyclopropyl 3-thienyl ketone thiosemicarbazone
3-chloropropyl-2-thienyl ketone thiosemicarbazone
4-amino-2-thienyl ethyl ketone thiosemicarbazone
2,5-dimethyl-3-thienyl ethyl ketone thiosemicarbazone
2-thienyl n-butyl ketone thiosemicarbazone
5-chloro-2-thienyl n-butyl ketone thiosemicarbazone
5-chloro-3-thienyl n-butyl ketone thiosemicarbazone
5-bromo-2-thienyl t-butyl ketone thiosemicarbazone
Isopropyl 2-thienyl ketone thiosemicarbazone
5-chloromethyl-2-thienyl ethyl ketone thiosemicarbazone
4-nitro-2-thienyl methyl ketone thiosemicarbazone
5-chloro-2-thienyl ethyl ketone thiosemicarbazone
5-nitro-2-thienyl ethyl ketone thiosemicarbazone
5-amino-2-thienyl ethyl ketone thiosemicarbazone
4-nitro-2-thienyl ethyl ketone thiosemicarbazone
5-chloro-2-thienyl n-propyl ketone thiosemicarbazone
1-adamantyl-2-thienyl ketone thiosemicarbazone
5-bromo-2-thienyl ethyl ketone thiosemicarbazone
n-propyl 2-thienyl ketone thiosemicarbazone
n-propyl 3-thienyl ketone thiosemicarbazone
5-bromo-2-thienyl isopropyl ketone thiosemicarbazone The compounds of the present invention are highly active anti-gestational agents. More particularly, the compounds of the present invention suppress the fertility of female animals, and are useful as antilittering agents in warm-blooded mammals such as mice, rabbits, rats and the like when incorporated into the diets of such animals.

The compounds of the present invention are also useful in inhibiting the initial laying of eggs in immature chickens when as little as 0.026 percent by weight is incorporated into the feed. The delay in egg laying results in improved egg production once the chicken has matured.

Compounds of the invention have also possessed antiinflammatory activity when administered in dose levels of from 10 to 60 mg./kg. of body weight.

Generally speaking, the thiosemicarbazones of this invention are obtained by reacting the corresponding ketone with a thiosemicarbazide solution, acidifying with concentrated HCl and refluxing for one hour. Upon cooling, a precipitate usually appears which is filtered off and recrystallized with a large amount of an organic solvent. If no precipitate results, the reaction is taken to dryness on a rotary evaporator. The resulting crude material is washed thoroughly with hot water, and then recrystallized with a large amount of an organic solvent.

An illustrative reaction sequence for the preparation of the new compounds is as follows:

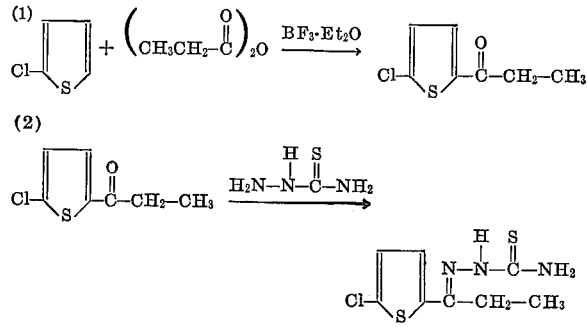

In the reaction sequence illustrated above, 2-chlorothiophene was converted to 5-chloro-2-thienyl ethyl ketone and the ketone subsequently reacted with thiosemicarbazide.

The present example will be more clearly understood from the following illustrative examples.

EXAMPLE 1

5-chloro-3-thienyl ethyl ketone thiosemicarbazone (a) Preparation of 2,5-dichloro-3-thienyl ethyl ketone.—To 20 g. (.13 M) 2,5-dichlorothiophene and 23.9 g. propionyl chloride in 100 ml. nitroethane was added slowly 19.5 g. (.148 M) $AlCl_3$. The reaction mixture turned black and heated to 43° C. The mixture was allowed to stir under $N_2$ at room temperature for 4 hours while HCl gas was blown off. The reaction mixture was poured over ice and then extracted with ether. The ether layer was washed with 10 percent NaOH and then with a saturated salt solution until neutral. The ether layer was evaporated down to yield dark black crystals. The crystals were dissolved in ether and distilled, 12 grams of material having a boiling point of 94–98° C./1.8 mm. were obtained. NMR analysis showed that 88 percent of the material was the desired 2,5-dichloro-3-thienyl ethyl ketone and 12 percent of the enol form.

(b) Conversion of 2,5-dichloro-3-thienyl ethyl ketone to 5-chloro-3-thienyl ethyl ketone.—To a mixture of 1.07 ml. acetic acid, 3.4 ml. $H_2O$ and 1.0 g. of 2,5-dichloro-3-thienyl ethyl ketone was added 2.2 g. of Zn dust. During the exothermic reaction that followed, the temperature rose to about 50° C. and everything but the zinc went into solution. After the reaction had subsided and cooled to room temperature, the reaction mixture was extracted with ether, washed with water until neutral, washed with a saturated salt solution and dried over anhydrous $Na_2CO_3$. Removal of the ether gave 0.7 g. of a crystalline solid. NMR analysis indicated a 75 percent yield of 5-chloro-3-thienyl ethyl ketone (M.P. 25–30° C.).

(c) Conversion of 5-chloro-3 thienyl ethyl ketone to 5-chloro-3-thienyl ethyl ketone thiosemicarbazone.—To 0.7 g. of 5-chloro-3-thienyl ethyl ketone in 15 ml. warm ethanol was added 0.5 g. of thiosemicarbazide in 10 ml. hot water. Four drops of concentrated HCl was then added and the reaction mixture refluxed for one hour. Upon cooling, no crystals resulted, but upon addition of 50 ml. water, and scratching, crystals having a melting point of 130–

135° C. were obtained. Recrystallization with ether yielded 0.257 g. of crystalline 5-chloro-3-thienyl ethyl ketone thiosemicarbazone having a melting point of 138–140° C.

*Analysis.*—Calculated for $C_8H_{10}ClN_3S_2$ (percent): C, 38.77; H, 4.06; N, 16.95. Found (percent): C, 38.50; H, 4.32; N, 17.04.

EXAMPLE 2

5-chloro-2-thienyl ethyl ketone thiosemicarbazone (a) Preparation of 5-chloro-2-thienyl ethyl ketone.— To 42 g. of 2-chlorothiophene and 47.5 g. propionic anhydride, 5.45 g. $BF_3 \cdot Et_2O$ (redistilled) was rapidly added. The mixture was stirred as the temperature rose to about 50° C. and then fell to room temperature after one hour. The reaction mixture was then heated to 90° C. for about thirty minutes. The mixture was cooled, poured into ice water and extracted with benzene. The extract was washed with water and a 5 percent $Na_2CO_3$ solution, and then with water until neutral. The organic layer was evaporated to a viscous oil (B.P., 110–125° C./6 mm.) which was distilled to give 36.8 g. of crystalline 5-chloro-2-thienyl ethyl ketone, M.P. 45–59° C.

(b) Conversion of 5-chloro-2-thienyl ethyl ketone to 5-chloro-2-thienyl ethyl ketone thiosemicarbazone.—To 5.5 g. of 5-chloro-2-thienyl ethyl ketone dissolved in 100 ml. of ethyl alcohol treated with decolorizing charcoal and filtered (colorless) was added a solution of 5.5 g. (0.06 M) of thiosemicarbazide dissolved in 100 ml. of hot water. Five drops of concentrated HCl were added and the reaction mixture refluxed for one hour, and cooled to room temperature whereupon needles separated. The reaction mixture was then cooled in ice. Yellow needles (6.5 g.) melting at 162–167° C. were separated by filtration. The solid material was recrystallized from 100 ml. of ethyl alcohol, filtered and the solid material washed with water and dried. 5-chloro-2-thienyl (5.5 g.) ethyl ketone thiosemicarbazone melting at 165–167° C. was obtained.

*Analysis.*—Calculated for $C_8H_{10}N_3S_2Cl$ (percent): C, 38.78; H, 4.07; N, 16.96. Found (percent): C, 39.04; H, 4.15; N, 17.08.

EXAMPLE 3

5-bromo-2-thienyl-t-butyl ketone thiosemicarbazone 5-bromo-2-thienyl-t-butyl ketone was prepared in the following manner. To 20.4 g. (0.2 M) pivalic acid in 100 ml. benzene was added 6.6 g. (0.04 M) $SiCl_4$. The solution was refluxed. As the reflux temperature rose from 57 to 80° C., HCl gas was evolved. After one hour, the solution was allowed to cool at room temperature. 26.1 g. 5-bromo-thiophene (0.16 M) was added, followed by the addition of 42 g. $SnCl_4$. The reaction mixture was then heated to 80° C. whereupon it turned black in about twenty minutes. The reaction mixture was cooled, added to ice water and extracted with benzene. The benzene layer was washed with 10 percent NaOH, then with water until neutral, dried and the solvent evaporated off to give 10 g. of crystalline 5-bromo-2-thienyl-t-butyl ketone melting at 55–57° C. NMR analysis confirmed the identity of the compound.

5-bromo-2-thienyl-t-butyl ketone (5 g.) was dissolved in 85 ml. ethyl alcohol. Thiosemicarbazide (3 g.) in 50 ml. hot $H_2O$ was added thereto. Eight drops of concentrated HCl was then added and the solution refluxed for one hour, cooled and filtered to yield crude material melting at 140–158° C. Recrystallization yielded 3.5 g. of 5-bromo-2-thienyl-t-butyl ketone thiosemicarbazone melting at 161–163° C.

EXAMPLE 4

2,5-dimethyl - 3 - thienyl ethyl ketone thiosemicarbazone

To 20 g. of 2,5-dimethyl thiophene and 21.5 g. propionyl chloride in 200 ml. of nitroethane was added 36 g. $AlCl_3$. After the temperature rose to 85° C., the reaction mixture was heated until the reaction turned black. The mixture was cooled, ice water added and benzene extraction carried out. The extract was washed with 10 percent NaOH and then water until neutral, dried, and the solvent distilled off to give a 20 g. of crystalline 2,5-dimethyl-3-thienyl ethyl ketone distilling at 108–112° C. and melting at 28–30° C.

Thiosemicarbazide (4 g.) in 20 ml. water was added to 5 g. of the 2,5-dimethyl-3-thienyl ethyl ketone in 30 ml. ethyl alcohol. Six drops of concentrated HCl was added and the solution refluxed for one hour, cooled and filtered. Nine grams of crude crystals having a melting point of 133–137° C. were obtained. Recrystallization with ether yielded 5 g. of 2,5-dimethyl-3-thienyl ethyl ketone thiosemicarbazone crystals having a melting point of 135–136° C.

EXAMPLE 5

Cyclopropyl - 2 - thienyl ethyl ketone thiosemicarbazone

To 2.0 g. cyclopropyl-2-thienyl ketone in 20 ml. hot ethanol was added 3.0 g. thiosemicarbazide in 20 ml. hot water. Four drops of concentrated HCl were added and the reaction mixture refluxed for one hour. The mixture was cooled, extracted with ether and washed with a saturated NaCl solution. After drying overnight and removal of the solvent, a crystalline material was obtained. The crystalline material was filtered and washed with cold water to yield 0.64 g. of cyclopropyl-2-thienyl ethyl ketone thiosemicarbazone (M.P., 135–138° C.).

*Analysis.*—Calculated for $C_9H_{11}N_3S_2$ (percent): C, 47.97; H, 4.92; N, 18.25. Found (percent): C, 48.29; H, 5.26; N, 18.21.

EXAMPLE 6

5-chloro-2-thienyl propyl ketone thiosemicarbazone

Twenty-six grams of 5-chloro-2-thienyl propyl ketone (M.P., 35–38° C.) was prepared according to the method of Example 2(a) by reacting 42 g. 2-chloro thiophene with 55.6 g. of butyric anhydride. The 5-chloro-2-thienyl propyl ketone was converted to 5-chloro-2-thienyl propyl ketone thiosemicarbazone (M.P., 106–108° C.) according to the method of Example 2(b).

*Analysis.*—Calculated for $C_9H_{12}N_3S_2Cl$ (percent): C, 41.29; H, 4.62; N, 16.05. Found (percent): C, 41.29; H, 4.90; N, 15.61.

EXAMPLE 7

5-chloro-2-thienyl n-butyl ketone thiosemicarbazone

Sixty grams of 5-chloro-2-thienyl n-butyl ketone (M.P., 28–30° C.) was prepared according to the method of Example 2(a) by reacting 42 g. of 2-chlorothiophene with 67 g. valeric anhydride. Two grams of the ketone was reacted with 3 g. thiosemicarbazide following the method of Example 2(b). 5-chloro-2-thienyl n-butyl ketone thiosemicarbazone (1.82 g.; M.P., 122–124° C.) was obtained.

*Analysis.*—Calculated for $C_{10}H_{14}N_3S_2Cl$ (percent): C, 43.54; H, 5.12; N, 15.23. Found (percent): C, 43.47; H, 5.33; N, 14.58.

EXAMPLE 8

5-bromo-2-thienyl ethyl ketone thiosemicarbazone 2-bromothiophene (29 g.) and propionic anhydride (23.75 g.) were reacted following the method of Example 2(a). Nine grams of 5-bromo - 2 - thienyl ethyl ketone (M.P., 50–53° C.) was obtained. The ketone (2.5 g.) was reacted with thiosemicarbazide (3 g.) according to the method of Example 2(b). 5-bromo-2-thienyl ethyl ketone thiosemicarbazone (0.986 g.; M.P., 163–165° C.) was obtained.

*Analysis.*—Calculated for $C_8H_{10}N_3S_2Br$ (percent): C, 32.88; H, 3.45; N, 14.38. Found (percent): C, 33.16; H, 3.62; N, 14.29.

EXAMPLE 9

5-iodo-2-thienyl ethyl ketone thiosemicarbazone 2-iodothiophene (16 g.) and propionic anhydride (10.1 g.) were reacted following the method of Example 2(a). 5-iodo-2-thienyl ethyl ketone (10.5 g.; M.P., 50–53° C.) were obtained. Four grams of the ketone and five grams of thiosemicarbazide were reacted following the method of Example 2(b). The reaction yielded 0.974 g. of 5-iodo-2-thienyl ethyl ketone thiosemicarbazone (M.P., 148–150° C.).

Analysis.—Calculated for $C_8H_{10}S_2N_3I$ (percent): C, 28.32; H, 2.97; N, 12.39. Found (percent): C, 28.75; H, 3.15; N, 12.53.

EXAMPLE 10 n-Propyl-2-thienyl ketone thiosemicarbazone n-Propyl-2-thienyl ketone (3 g.) and thiosemicarbazide (4 g.) were reacted according to the method of Example 2(b). n-Propyl-2-thienyl ketone thiosemicarbazone (4 g.; M.P., 165–167° C.) was obtained.

Analysis.—Calculated for $C_9H_{13}S_2N_3$ (percent): C, 47.54; H, 5.76; N, 18.48. Found (percent): C, 47.74; H, 6.20; N, 18.32.

EXAMPLE 11

5-chloromethyl-2-thienyl ethyl ketone thiosemicarbazone

A stream of dry HCl was passed through a mixture of 11.2 g. 2-propiothionone, 3.7 g. para-formaldehyde and 2.8 g. anhydrous $ZnCl_2$ in 42 ml. of dry $CHCl_3$ for three hours. The temperature was maintained at 25–30° C. The solution was then poured into water, the organic layer separated and the aqueous layer extracted with $CHCl_3$. The organic extract was combined with the organic layer, washed with water and dried over $CaCl_2$. The chloroform was distilled off and the residue distilled under vacuum. NMR analysis indicated a 50-50 mixture of the 5-chloromethyl-2-thienyl ethyl ketone and the 4-chloromethyl-2-thienyl ethyl ketone isomers. These were separated by fractional recrystallization with ether.

Analysis.—Calculated for $C_8H_9SOCl$ (percent): C, 50.92; H, 4.81; Cl, 18.79. Found (percent): C, 50.60; H, 4.88; Cl, 18.84.

5-chloromethane-2-thienyl ketone (4 g.) and thiosemicarbazide (5 g.) were reacted according to the method of Example 2(b) to yield 3 g. of 5-chloromethyl-2-thienyl ethyl ketone thiosemicarbazone.

EXAMPLE 12

3-chloropropyl-2-thienyl ketone thiosemicarbazone 3-chloropropyl-2-thienyl ketone thiosemicarbazone is prepared by reacting 3-chloropropyl-2-thienyl ketone with thiosemicarbazide following the method of Example 2(b).

EXAMPLE 13

5-bromo-2-thienyl iso-propyl ketone thiosemicarbazone 2-bromothiophene (29 g.) and iso-butyric anhydride (29 g.) were reacted following the method of Example 2(a). 5-bromo-2-thienyl isopropyl ketone (26 g.; M.P., 73–77° C.) were obtained.

Five grams of the ketone and four grams thiosemicarbazone were reacted according to the method of Example 2(b). 5-bromo-2-thienyl iso-propyl ketone thiosemicarbazone (0.707 g.; M.P., 121–124° C.) was recovered.

Analysis.—Calculated for $C_9H_{12}S_2N_3Br$ (percent): C, 35.29; H, 3.95; N, 13.72. Found (percent): C, 35.32; H, 4.02; N, 13.56.

EXAMPLE 14

4-nitro-2-thienyl ethyl ketone thiosemicarbazone

To a solution of 20 g. 2-thienyl ethyl ketone in 54 g. acetic anhydride, acetyl nitrate (prepared by slowly adding 32 g. fuming $HNO_3$ to 32 g. acetic anhydride, being careful to keep reaction temperature below 20° C.) was added with vigorous stirring over thirty minutes while keeping the reaction mixture below 10° C. with an ice-salt bath. The acetyl nitrate was kept below 6° C. while adding. After addition, the reaction was stirred for fifteen more minutes while cold, and then ten additional minutes without cooling. The reaction was filtered after adding to ice water. Approximately 20 g. of crude material melting at 90–120° C. was obtained. Fractional recrystallization yielded 6.8 g. pure 4-nitro-2-thienyl ethyl ketone (M.P. 134–138° C.) and 4.1 g. 5-nitro-2-thienyl ethyl ketone (M.P. 75–80° C.).

To 3 g. of 4-nitro-2-thienyl ethyl ketone in 55 ml. hot EtOH was added 2 g. thiosemicarbazide dissolved in 25 ml. hot $H_2O$. To this solution was added eight drops concentrated HCl and the solution refluxed for one hour. The solution was then cooled and filtered to get 4.5 g. crude product. Recrystallization with MeOH gave 2.6 g. 4-nitro-2-thienyl ethyl ketone thiosemicarbazone (M.P. 213–215° C.).

EXAMPLE 15

1-adamantyl 2-thienyl ketone thiosemicarbazone 1-adamantyl 2-thienyl ketone thiosemicarbazone was made according to the method of Example 3 utilizing 0.2 M adamantoic acid and 0.16 M. thiophene to yield 2.5 g. of the compound (M.P., 255–257° C. with decomposition).

Analysis.—Calculated for $C_{12}H_{21}N_3S_2$ (percent): C, 60.14; H, 6.52; N, 13.15. Found (percent): C, 60.10; H, 6.80; N, 12.90.

We claim:

1. A compound having the formula

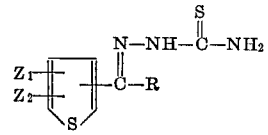

wherein R is $C_3$–$C_6$ cycloalkyl, phenyl, 1-adamantyl, or carboxyl; and each of $Z_1$ and $Z_2$ independently is hydrogen, $C_1$–$C_5$ alkyl, halo, amino, or nitro.

2. A compound according to claim 1 selected from the group consisting of cyclopropyl 2-thienyl ketone thiosemicarbazone and cyclopropyl 3-thienyl ketone thiosemicarbazone.

3. A compound having the formula:

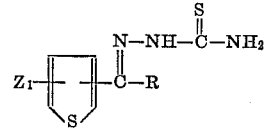

wherein R is $C_2$–$C_5$ alkyl and $Z_1$ is amino or nitro.

4. A compound according to claim 3 selected from the group consisting of 5-nitro-2-thienyl ethyl ketone thiosemicarbazone and 4-nitro-2-thienyl ethyl ketone thiosemicarbazone.

References Cited

Schuler et al., C.A. 46: 1148 (2–52).
Anderson et al., C.A. 47: 568–9 (1–53).
Profft et al., C.A. 61: 8254–7 (9–64).

HENRY R. JILES, Primary Examiner

C. M. SHURCO, Assistant Examiner

U.S. Cl. X.R.

260—332.2, 332.3, 332.5; 424—275